(12) United States Patent
Liu et al.

(10) Patent No.: US 12,238,619 B2
(45) Date of Patent: Feb. 25, 2025

(54) DATA SENDING METHOD, APPARATUS, AND COMPUTER-READABLE STORAGE MEDIUM FOR DATA TRANSMISSION THROUGH A SIDELINK

(71) Applicant: Shenzhen Yinwang Intelligent Technologies Co., Ltd., Shenzhen (CN)

(72) Inventors: Hang Liu, Beijing (CN); Mingchao Li, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 634 days.

(21) Appl. No.: 17/496,928

(22) Filed: Oct. 8, 2021

(65) Prior Publication Data

US 2022/0030400 A1   Jan. 27, 2022

Related U.S. Application Data

(63) Continuation of application No. PCT/CN2020/076228, filed on Feb. 21, 2020.

(30) Foreign Application Priority Data

Apr. 8, 2019  (CN) .......................... 201910277864.0

(51) Int. Cl.
*H04W 4/40*     (2018.01)
*H04L 45/74*    (2022.01)
(Continued)

(52) U.S. Cl.
CPC ............... *H04W 4/40* (2018.02); *H04L 45/74* (2013.01); *H04W 40/02* (2013.01); *H04W 92/18* (2013.01)

(58) Field of Classification Search
CPC ......... H04W 4/40; H04W 4/02; H04W 92/18; H04W 76/14; H04W 76/23; H04L 45/74; H04L 45/741; H04L 45/742; H04L 45/745

See application file for complete search history.

(56) References Cited

U.S. PATENT DOCUMENTS 6,597,708 B1 * 7/2003 Mauger .............. H04Q 11/0478
                                                    370/395.6
7,466,810 B1 * 12/2008 Quon ................ H04M 3/42229
                                                    709/201
(Continued)

FOREIGN PATENT DOCUMENTS

CN      102045882 A      5/2011
CN      106453028 A      2/2017
(Continued)

OTHER PUBLICATIONS

InterDigital Inc., "Support For Unicast and Groupcast in NR V2X," 3GPP RAN WG2 Meeting #104, R2-1816787, Spokane, USA, Nov. 12-16, 2018, 4 pages.

(Continued)

*Primary Examiner* — Jenee Holland
(74) *Attorney, Agent, or Firm* — Conley Rose, P.C.

(57) ABSTRACT

A data sending method includes an adaptation layer that obtains first data and attribute information corresponding to the first data from a network layer, where the attribute information includes destination address information, the adaptation layer generates a first access layer address based on the destination address information, the adaptation layer transfers the first data and the first access layer address to an access layer, and the access layer sends the first data through a sidelink based on the first access layer address.

20 Claims, 6 Drawing Sheets

(51) Int. Cl.
    *H04L 61/103*     (2022.01)
    *H04L 69/321*     (2022.01)
    *H04W 40/02*     (2009.01)
    *H04W 40/24*     (2009.01)
    *H04W 76/14*     (2018.01)
    *H04W 80/02*     (2009.01)
    *H04W 92/18*     (2009.01)

(56) References Cited

U.S. PATENT DOCUMENTS

| | | | |
|---|---|---|---|
| 9,420,518 B2 | 8/2016 | Purohit et al. | |
| 2003/0108034 A1* | 6/2003 | Yu | H04L 12/5692 370/352 |
| 2003/0112788 A1* | 6/2003 | Erhart | H04L 12/5601 370/345 |
| 2004/0037318 A1* | 2/2004 | Salin | H04L 69/32 370/465 |
| 2004/0225719 A1* | 11/2004 | Kisley | G06F 3/061 709/212 |
| 2005/0064906 A1* | 3/2005 | Metzler | H04L 12/66 455/560 |
| 2005/0176473 A1* | 8/2005 | Melpignano | H04L 69/161 455/574 |
| 2006/0109851 A1* | 5/2006 | Hadjiahmad | H04L 12/5601 370/395.54 |
| 2009/0073983 A1* | 3/2009 | Kim | H04W 80/06 370/392 |
| 2009/0146833 A1* | 6/2009 | Lee | H04L 69/16 340/9.13 |
| 2009/0161581 A1* | 6/2009 | Kim | H04L 61/5007 370/254 |
| 2010/0217882 A1* | 8/2010 | Yang | H04L 12/4633 709/229 |
| 2010/0254382 A1* | 10/2010 | Steffen | H04L 12/40006 370/389 |
| 2011/0065440 A1* | 3/2011 | Kakani | H04W 28/18 455/450 |
| 2011/0069652 A1* | 3/2011 | Kakani | H04L 12/185 370/312 |
| 2011/0235635 A1* | 9/2011 | Yadav | H04Q 11/0067 398/58 |
| 2012/0207163 A1* | 8/2012 | Schrum | H04L 12/5692 370/392 |
| 2015/0006951 A1* | 1/2015 | Gurram | G06F 11/2028 714/4.12 |
| 2015/0029913 A1* | 1/2015 | Zhou | H04W 80/00 370/281 |
| 2016/0043942 A1* | 2/2016 | Purohit | H04W 40/244 370/338 |
| 2016/0197743 A1 | 7/2016 | Su et al. | |
| 2016/0234752 A1* | 8/2016 | Hsu | H04L 12/4641 |
| 2016/0234851 A1* | 8/2016 | Zhang | H04W 72/54 |
| 2017/0215122 A1* | 7/2017 | Nigam | H04L 69/22 |
| 2018/0035440 A1* | 2/2018 | Ohta | H04M 15/41 |
| 2018/0167814 A1* | 6/2018 | Fujishiro | H04W 76/27 |
| 2018/0287689 A1 | 10/2018 | Lee et al. | |
| 2019/0029061 A1 | 1/2019 | Feng | |
| 2019/0045574 A1* | 2/2019 | Feng | H04W 76/12 |
| 2019/0364585 A1 | 11/2019 | Lee et al. | |
| 2019/0387446 A1* | 12/2019 | Xu | H04W 36/0061 |
| 2020/0314613 A1* | 10/2020 | Lee | H04W 4/40 |
| 2020/0344637 A1* | 10/2020 | Kim | H04W 4/06 |
| 2020/0413457 A1* | 12/2020 | Hong | H04W 76/10 |
| 2021/0014716 A1* | 1/2021 | Zhou | H04W 24/10 |
| 2021/0014768 A1* | 1/2021 | Hong | H04W 40/22 |
| 2021/0036986 A1* | 2/2021 | Qi | H04L 61/2546 |
| 2021/0127319 A1* | 4/2021 | Huang | H04W 40/02 |
| 2021/0195666 A1* | 6/2021 | Luo | H04W 88/04 |
| 2021/0219105 A1* | 7/2021 | Fan | H04W 4/40 |
| 2021/0282098 A1* | 9/2021 | Luo | H04W 72/51 |
| 2021/0297842 A1 | 9/2021 | Shrivastava | |
| 2021/0298032 A1* | 9/2021 | Lu | H04W 76/11 |
| 2021/0368417 A1* | 11/2021 | Luo | H04W 40/22 |
| 2022/0007445 A1* | 1/2022 | Pan | H04W 40/22 |
| 2022/0046477 A1* | 2/2022 | Kusashima | H04W 28/16 |
| 2022/0141890 A1* | 5/2022 | Miao | H04W 76/10 370/329 |

FOREIGN PATENT DOCUMENTS

| | | |
|---|---|---|
| CN | 108809897 A | 11/2018 |
| CN | 109479189 A | 3/2019 |
| KR | 20180135867 A | 12/2018 |
| WO | 2016163036 A1 | 10/2016 |
| WO | 2017166138 A1 | 10/2017 |

OTHER PUBLICATIONS

CATT, "SDAP Open Issues," 3GPP TSG-RAN WG2 Meeting #105bis, R2-1903175, Xi"an, China, Apr. 8-12, 2019, 3 pages.

Xiaomi Communications, "On Support of Sidelink Unicast, Groupcast and Broadcast", 3GPP TSG RAN WG1 Meeting #94, R1-1809174, Gothenburg, Sweden, Aug. 20-24, 2018, 2 pages.

Nokia et al., "Adaptation layer in IAB MT," 3GPP TSG-RAN WG2 Meeting #103, R2-1812303, Gothenburg, Sweden, Aug. 20-24, 2018, 2 Pages.

Kyocera, "Consideration of the L2 relay bearer modelling", 3GPP TSG-RAN WG2 #96 R2-168397, Reno, USA, Nov. 14-18, 2016, 4 Pages.

* cited by examiner

DATA SENDING METHOD, APPARATUS, AND COMPUTER-READABLE STORAGE MEDIUM FOR DATA TRANSMISSION THROUGH A SIDELINK

CROSS-REFERENCE TO RELATED APPLICATIONS

This application is a continuation of International Patent Application No. PCT/CN2020/076228 filed on Feb. 21, 2020, which claims priority to Chinese Patent Application No. 201910277864.0 filed on Apr. 8, 2019. The disclosures of the aforementioned applications are hereby incorporated by reference in their entireties.

TECHNICAL FIELD

This application relates to the field of communication technologies, and in particular, to a data sending method and apparatus, and a computer-readable storage medium.

BACKGROUND

A vehicle-mounted terminal may obtain traffic condition information or receive an information service in a timely manner through communication technologies such as vehicle-to-vehicle (V2V) communication, vehicle-to-infrastructure (V2I) communication, vehicle-to-pedestrian (V2P) communication, or vehicle-to-network (V2N) communication. These communication modes may be collectively referred to as vehicle-to-everything (V2X) communication.

The Long-Term Evolution (LTE)-V2X communication protocol standardized by the 3rd Generation Partnership Project (3GPP) can support sidelink-based V2X communication, that is, communication directly performed without a need for forwarding through a transition device (for example, a base station).

However, in the current LTE-V2X protocol, only a mode of broadcast transmission on a sidelink can be supported, a unicast or multicast transmission mode cannot be supported.

SUMMARY

Embodiments of this application provide a data sending method and apparatus, and a computer-readable storage medium, to resolve a technical problem in which sidelink-based V2X communication cannot support unicast or multicast communication.

According to a first aspect, an embodiment of this application provides a data sending method, including an adaptation layer obtains first data and attribute information corresponding to the first data from a network layer. The attribute information includes destination address information. The adaptation layer generates a first access layer address based on the destination address information. The adaptation layer transfers the first data and the first access layer address to an access layer. The access layer sends the first data through a sidelink based on the first access layer address.

The adaptation layer, the network layer, and the access layer are all protocol stacks of a first device.

In this embodiment of this application, because the first access layer address is generated by the adaptation layer based on the destination address information, the first access layer address may indicate a destination device corresponding to the first data. In this case, when receiving data, the destination device may determine, based on the first access layer address, whether the first data is data sent to the destination device, and receive the first data when determining that an address of the destination device matches the first access layer address. Further, unicast communication is implemented when the destination address information indicates an address of a single destination device, and multicast communication is implemented when the destination address information indicates addresses of a plurality of destination devices. This effectively resolves the technical problem in which sidelink-based V2X communication cannot support unicast or multicast communication.

In a possible design, before generating the first access layer address based on the destination address information, the adaptation layer may further determine that an addressing type corresponding to the first data is address-based addressing.

To improve solution flexibility, in this embodiment of this application, for the step in which the adaptation layer determines that the addressing type corresponding to the first data is address-based addressing, there may be at least the following four implementation solutions:

Solution 1: The adaptation layer determines, based on the destination address information, that the addressing type is address-based addressing.

Solution 2: The adaptation layer determines, based on service type information, that the addressing type is address-based addressing.

Solution 3: The adaptation layer determines, based on the service type information and the destination address information, that the addressing type corresponding to the first data is address-based addressing.

Solution 4: The adaptation layer determines, based on transfer mode indication information, that the addressing type corresponding to the first data is address-based addressing.

To further improve solution flexibility, in a possible design, in the solution 1, for the step in which the adaptation layer determines that the addressing type corresponding to the first data is address-based addressing, there may be at least the following three specific implementations:

First implementation: The adaptation layer determines, based on a value of the destination address information, that the addressing type is address-based addressing.

For example, when the value of the destination address information is greater than or equal to a first threshold, the adaptation layer determines that the addressing type is address-based addressing. Alternatively, when the value of the destination address information is less than or equal to a second threshold, the adaptation layer determines that the addressing type is address-based addressing. Alternatively, when the value of the destination address information is greater than or equal to a third threshold and is less than or equal to a fourth threshold, the adaptation layer determines that the addressing type is address-based addressing.

Second implementation: The adaptation layer determines, based on a bit quantity of the destination address information, that the addressing type is address-based addressing.

For example, when the bit quantity of the destination address information is greater than or equal to a first bit quantity, the adaptation layer determines that the addressing type is address-based addressing. Alternatively, when the bit quantity of the destination address information is less than or equal to a second bit quantity, the adaptation layer determines that the addressing type is address-based addressing. Alternatively, when the bit quantity of the destination address information is greater than or equal to a third bit quantity and is less than or equal to a fourth bit quantity, the adaptation layer determines that the addressing type is address-based addressing.

Third implementation: The adaptation layer determines, based on a preset field in the destination address information, that the addressing type is address-based addressing.

For example, the preset field indicates that the addressing type of the first data is address-based addressing. For another example, the preset field indicates that a transmission mode corresponding to the first data is non-broadcast. Correspondingly, when the adaptation layer determines that the preset field in the destination address information indicates that the transmission mode corresponding to the first data is non-broadcast, the adaptation layer determines that the addressing type is address-based addressing. For another example, the preset field indicates that a transmission mode corresponding to the first data is unicast or multicast. Correspondingly, when the adaptation layer determines that the preset field in the destination address information indicates that the transmission mode corresponding to the first data is unicast or multicast, the adaptation layer determines that the addressing type is address-based addressing.

To further improve solution flexibility, in a possible design, in the solution 2, the attribute information obtained by the adaptation layer from the network layer may further include the service type information in addition to the destination address information. The service type information indicates a service type corresponding to the first data. For the step in which the adaptation layer determines, based on the service type information, that the addressing type corresponding to the first data is address-based addressing, there may be at least the following three specific implementations:

First implementation: The adaptation layer determines, based on a value of the service type information, that the addressing type is address-based addressing.

For example, when the value of the service type information is greater than or equal to a fifth threshold, the adaptation layer determines that the addressing type is address-based addressing. Alternatively, when the value of the service type information is less than or equal to a sixth threshold, the adaptation layer determines that the addressing type is address-based addressing. Alternatively, when the value of the service type information is greater than or equal to a seventh threshold and is less than or equal to an eighth threshold, the adaptation layer determines that the addressing type is address-based addressing.

Second implementation: The adaptation layer determines, based on a bit quantity of the service type information, that the addressing type is address-based addressing.

For example, when the bit quantity of the service type information is greater than or equal to a fifth bit quantity, the adaptation layer determines that the addressing type is address-based addressing. Alternatively, when the bit quantity of the service type information is less than or equal to a sixth bit quantity, the adaptation layer determines that the addressing type is address-based addressing. Alternatively, when the bit quantity of the service type information is greater than or equal to a seventh bit quantity and is less than or equal to an eighth bit quantity, the adaptation layer determines that the addressing type is address-based addressing.

Third implementation: The adaptation layer determines, based on a preset field in the service type information, that the addressing type is address-based addressing.

For example, the preset field indicates that the addressing type of the first data is address-based addressing. For another example, the preset field indicates that a transmission mode corresponding to the first data is non-broadcast. Correspondingly, when the adaptation layer determines that the preset field in the service type information indicates that the transmission mode corresponding to the first data is non-broadcast, the adaptation layer determines that the addressing type is address-based addressing. For another example, the preset field indicates that a transmission mode corresponding to the first data is unicast or multicast. Correspondingly, when the adaptation layer determines that the preset field in the service type information indicates that the transmission mode corresponding to the first data is unicast or multicast, the adaptation layer determines that the addressing type is address-based addressing.

To further improve solution flexibility, in a possible design, in the solution 3, a specific implementation in which the adaptation layer determines, based on the service type information and the destination address information, that the addressing type corresponding to the first data is address-based addressing may be a combination of any implementation in the solution 1 and/or the solution 2.

For example, when the value of the destination address information is greater than or equal to the first threshold, and the preset field in the destination address information indicates that the addressing type of the first data is address-based addressing, the adaptation layer determines that the addressing type is address-based addressing. For another example, when the value of the destination address information is greater than or equal to the first threshold, and the value of the service type information is greater than or equal to the fifth threshold, the adaptation layer determines that the addressing type is address-based addressing. Certainly, only two example descriptions are provided herein, and there may be another combination manner during specific implementation.

For example, the service type information in the solution 2 and the solution 3 may be an application identifier (AID)/provider service identifier (PSID).

To further improve solution flexibility, in a possible design, in the solution 4, the attribute information obtained by the adaptation layer from the network layer may further include the transmission mode indication information in addition to the destination address information. The transmission mode indication information indicates a transmission mode corresponding to the first data. For the step in which the adaptation layer determines that the addressing type corresponding to the first data is address-based addressing, there may at least the following three implementations:

First implementation: When the transmission mode indication information indicates address-based addressing, the adaptation layer determines that the addressing type corresponding to the first data is address-based addressing.

Second implementation: When the transmission mode indication information indicates that the transmission mode corresponding to the first data is unicast or multicast, the adaptation layer determines that the addressing type corresponding to the first data is address-based addressing.

Third implementation: When the transmission mode indication information indicates that the transmission mode corresponding to the first data is non-broadcast, the adaptation layer determines that the addressing type corresponding to the first data is address-based addressing.

In a possible design, the adaptation layer may obtain the first access layer address by intercepting a preset field in the destination address information. The preset field may be a field at any location in the destination address information. This is not further limited in this embodiment of this application.

For example, the adaptation layer may use a field on most significant 24 bits or a field on least significant 24 bits in the destination address information as the first access layer address.

For example, the adaptation layer may splice a first preset field and a second preset field in the destination address information as the first access layer address. A specific splicing manner is not further limited in this embodiment of this application.

For solution integrity, in a possible design, the adaptation layer may alternatively determine that the addressing type is not address-based addressing, but, for example, service type-based addressing. In this case, the adaptation layer may generate a second access layer address based on the service type information. Then, the adaptation layer transfers the first data and the second access layer address to the access layer, so that the access layer sends the first data through a sidelink based on the second access layer address. In this implementation, based on a correspondence between a service type and the second access layer address, a receive end device can identify, based on the second access layer address, only a service type corresponding to the first data, and cannot identify the destination device corresponding to the first data. Therefore, only broadcast communication can be implemented in such a manner.

According to a second aspect, an embodiment of this application provides a data sending apparatus, including an adaptation layer module configured to obtain first data and attribute information corresponding to the first data from a network layer, where the attribute information includes destination address information, generate a first access layer address based on the destination address information, and transfer the first data and the first access layer address to an access layer module, and the access layer module configured to send the first data through a sidelink based on the first access layer address.

In a possible design, the adaptation layer module is further configured to before generating the first access layer address based on the destination address information, determine that an addressing type corresponding to the first data is address-based addressing.

For specific implementations of the operations performed by the adaptation layer module and the access layer module, refer to the specific implementations in which the adaptation layer and the access layer perform the corresponding method steps in the first aspect. Details are not described herein again.

According to a third aspect, an embodiment of this application provides a data sending apparatus. The apparatus includes at least one processor, and a memory and a communications interface that are communicatively connected to the at least one processor. The memory stores an instruction that can be executed by the at least one processor. The at least one processor executes the instruction stored in the memory, to perform the method according to any one of the first aspect or the possible implementations of the first aspect.

According to a fourth aspect, an embodiment of this application provides a computer-readable storage medium. The computer-readable storage medium stores a computer program. The computer program includes a program instruction. When executed by a computer, the computer is enabled to perform the method according to any one of the first aspect or the possible implementations of the first aspect.

DESCRIPTION OF EMBODIMENTS

Figure 1:
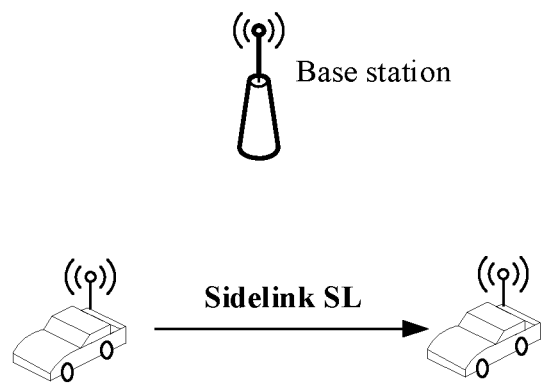
FIG. 1 is a schematic diagram of sidelink-based V2X communication.

To make the purpose, technical solutions, and advantages of the embodiments of this application clearer, the following clearly and completely describes the technical solutions of the embodiments of this application with reference to the accompanying drawings in the embodiments of this application.

In the following, some terms of the embodiments of this application are described, so as to help persons skilled in the art have a better understanding.

(1) A terminal may refer to a device that provides a user with voice and/or data connectivity, for example, may be a handheld device with a wireless connection function, or a processing device connected to a wireless modem. The terminal may communicate with a core network through a radio access network (RAN), and exchange voice and/or data with the RAN. The terminal may be referred to as a vehicle, a user equipment (UE), a wireless terminal device, a mobile terminal device, a subscriber unit, a subscriber station, a mobile station, a mobile console, a remote station, an access point (AP), a remote terminal, an access terminal, a user terminal device (or a user terminal), a user agent, a user device, or the like. For example, the terminal may include a mobile phone (or a cellular phone), a computer with a mobile terminal device, a dedicated terminal device in a narrowband Internet of things (NB-IoT), or a portable, pocket-sized, handheld, computer built-in, or vehicle-mounted mobile apparatus. For example, it may be a device such as a personal communication service (PCS) phone, a cordless telephone set, a Session Initiation Protocol (SIP) phone, a wireless local loop (WLL) station, or a personal digital assistant (PDA).

In the embodiments of this application, the terminal may further include a V2X device, for example, an on-board-unit (OBU) in a vehicle. In the following description, for example, the terminal is mainly a V2X device.

(2) The base station may be configured to mutually convert a received over-the-air frame and an Internet Protocol (IP) packet and serve as a router between the wireless terminal and a rest portion of the access network, where the rest portion of the access network may include an IP network. The base station may coordinate attribute management of the air interface. For example, the base station may be a network device in a fifth generation mobile communications system (5G) system, for example, a next-generation Node B (gNB), or may be a base transceiver station (BTS) in the Global System for Mobile Communications (GSM) or code-division multiple access (CDMA), or may be a Node B in wideband CDMA (WCDMA), or may be an eNB or e-NodeB in LTE. This is not limited in the embodiments of this application.

(3) V2X: A vehicle may obtain traffic information or receive information through V2V, V2I, V2P, V2N, or another manner. These communication modes may be collectively referred to as V2X communication. The most common V2V and V2I are used as an example. A vehicle may broadcast information, such as a vehicle speed, a driving direction, a specific location, or whether an emergency brake is stepped on, of the vehicle to a nearby vehicle through V2V communication. The nearby vehicle obtains such information, so that a driver can better sense a traffic status beyond a visual range, to make an early judgment on a dangerous status, and further make timely avoidance. For V2I communication, in addition to interaction of the foregoing security information, a roadside infrastructure may further provide various types of service information, data network access, and the like for the vehicle. Functions such as no-stop charging and in-vehicle entertainment greatly improve traffic intelligence. Usually, a network used for V2X communication is referred to as an internet of vehicles.

(4) A PC5 interface is a direct communications interface between terminal devices that is introduced in a D2D project of the 3rd generation partnership project release 12 (Rel-12). Adjacent terminals may transmit data to each other through a direct link within an effective communication range of PC5, without a need for forwarding through a central node (for example, a base station) or a need for information transmission through a conventional cellular link. Therefore, the communication is fast and easy. Sidelink communication between V2X devices is also performed through the PC5 interface.

(5) The terms "system" and "network" may be used interchangeably in the embodiments of this application. The term "and/or" describes an association relationship for describing associated objects and represents that three relationships may exist. For example, A and/or B may represent the following three cases: only A exists, both A and B exist, and only B exists. In addition, the character "/" generally indicates an "or" relationship between the associated objects. Terms such as "first" and "second" are used only to distinguish between purposes of description, and should not be understood as indicating or implying relative importance, and should not be understood as indicating or implying an order. "Multiple" refers to two or more than two.

The technologies described herein can be used for various types of communications systems, for example, an LTE system, a 5G, and other such communications systems. The technical solutions in the embodiments of this application are not limited to V2X communication, but can also be used for other device-to-device communication, machine-to-machine communication, or communication in another internet-of-things system.

To better understand the technical solutions provided in the embodiments of this application, the following first describes the technical background of the embodiments of this application.

A large quantity of traffic accidents occur every year around the world, causing a large quantity of casualties and property losses. A main reason for traffic accidents is the lack of timely and reliable information interaction between vehicles. An internet-of-vehicles system (vehicle network) is intended to improve road safety, improve traffic operation efficiency, and provide users with rich streaming media services through V2V, V2I, V2P, V2N, and other communications technologies.

An ITS has strict requirements for low latency and high reliability of communication. The LTE-V2X technology standardized by 3GPP has advantages such as a low latency, a high speed, wide coverage, and high reliability, and is a good internet-of-vehicles technology. The LTE-V2X supports vehicle-to-vehicle, vehicle-to-pedestrian, vehicle-to-infrastructure, and vehicle-to-network bidirectional communication. The V2V communication is mainly used as an example for description.

Figure 2:
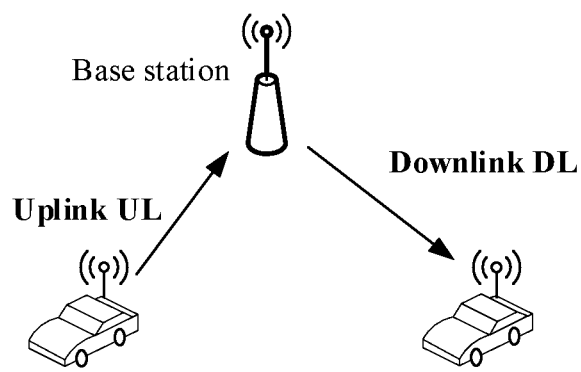
FIG. 2 is a schematic diagram of V2X communication based on cellular network evolved node B (eNB) transition.

The LTE-V2X communication supports two communication modes, including sidelink-based V2X communication shown in FIG. 1 and V2X communication based on eNB transition shown in FIG. 2. For example, a terminal in FIG. 1 is a vehicle. During actual application, the terminal may alternatively be another type of terminal, such as a mobile phone or a computer. This is not further limited in this embodiment of this application.

The sidelink-based V2X communication means that a data sending terminal and a data receiving terminal directly communicate with each other through a sidelink. The link through which the terminals implement direct communication is referred to as a sidelink (SL), or referred to as a side link. The V2V communication based on cellular network transition means that terminals implement communication through transition by a base station. To be specific, data sent by a data sending terminal needs to be forwarded by the base station to a data receiving terminal. Further, UE sends data to a base station through an uplink between the UE and the base station, and then the base station sends the data to another UE through a downlink between the base station and the other UE.

Further, the sidelink-based V2X communication is further classified into two communication modes: a base station scheduling mode (mode 3) and autonomous resource selection and scheduling (mode 4).

In the base station scheduling mode, a terminal accesses an LTE network, a base station is responsible for allocating a resource for sidelink transmission of vehicle-to-vehicle direct communication, and the terminal performs sidelink communication by using the resource scheduled by the base station. In the autonomous resource selection and scheduling by the terminal, the base station configures a resource pool for the terminal by using Radio Resource Control (RRC) signaling (including dedicated RRC signaling or a system information block (SIB) message). The terminal autonomously obtains a resource from the resource pool to perform sidelink communication. When the terminal falls out coverage of the network, the resource pool may be preconfigured. In this case, the terminal obtains a resource from the preconfigured resource pool to perform sidelink communication. The terminal may autonomously obtain a resource from the resource pool in a random resource selection manner, or in an interception-based resource selection manner, or in another manner. This is not limited in the embodiments of this application.

Figure 3:
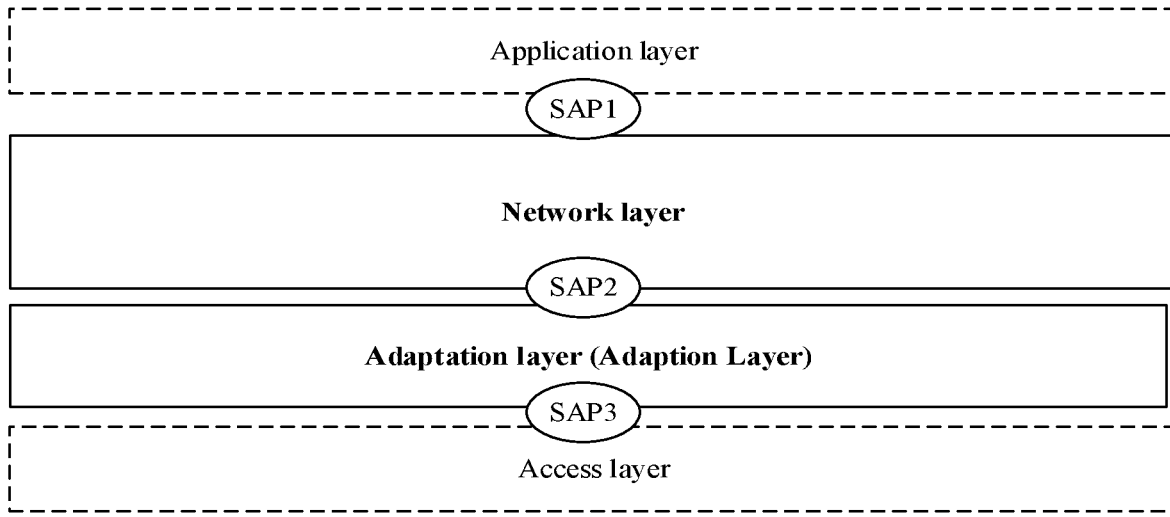
FIG. 3 is a schematic diagram of a protocol stack architecture of intelligent transportation system (ITS) system data transmission.

FIG. 3 is a schematic diagram of a protocol stack architecture of ITS system data transmission. As shown in FIG. 3, the protocol stack architecture includes at least an application layer, a network layer, an adaptation layer, and an access layer.

The access layer is a layer used to provide functions such as communication network node addressing, communication medium access control, and data transmission communication physical connection establishment, keeping, and maintenance. The access layer can provide a communications interface for communication between devices. The access layer may include a plurality of different access technologies, such as an LTE-V2X PC5 interface and a WI-FI interface. Different access technologies may correspond to different communications interfaces.

The network layer is located above the access layer and is configured to implement network topology control, data routing, device data transmission, and an application communication service.

The application layer is located above the network layer and is a layer configured to provide a user with various types of applications and service means.

There may be different networks and/or transport protocols at the network layer, and there may be a plurality of different access technologies at the access layer. Therefore, the adaptation layer is configured to provide transport adaptation functions between the different access technologies and the different networks and/or transport protocols. For example, the adaptation layer receives a data packet transferred by an upper layer (above the adaptation layer), distinguishes a bottom layer (under the adaptation layer) access technology (such as LTE-V2X PC5 or WI-FI) used by the data packet, and submits the data packet to a bottom layer (under the adaptation layer) conforming to the corresponding access technology for transmission, or receives a data packet from a bottom layer (under the adaptation layer), distinguishes a type of an upper layer (above the adaptation layer) protocol to which the data packet belongs, and submits the data packet to the corresponding upper layer protocol for processing. For another example, different networks and/or transport protocols and different access layer technologies may use different address information. The adaptation layer generates an access layer address based on destination address information corresponding to the data packet, and submits the access layer address to the access layer.

It should be noted that, the adaptation layer is a logical layer, and a function of the adaptation layer may exist as an independent layer and is also included in a "generalized network layer" or a "generalized access layer" (for example, as a sublayer). When the function of the adaptation layer is included in a "generalized network layer", the "generalized network layer" includes at least functions of the network layer and the adaptation layer in the present application. Similarly, when the function of the adaptation layer is included in a "generalized access layer", the "generalized access layer" includes at least functions of the access layer and the adaptation layer in the present application.

Figure 4:
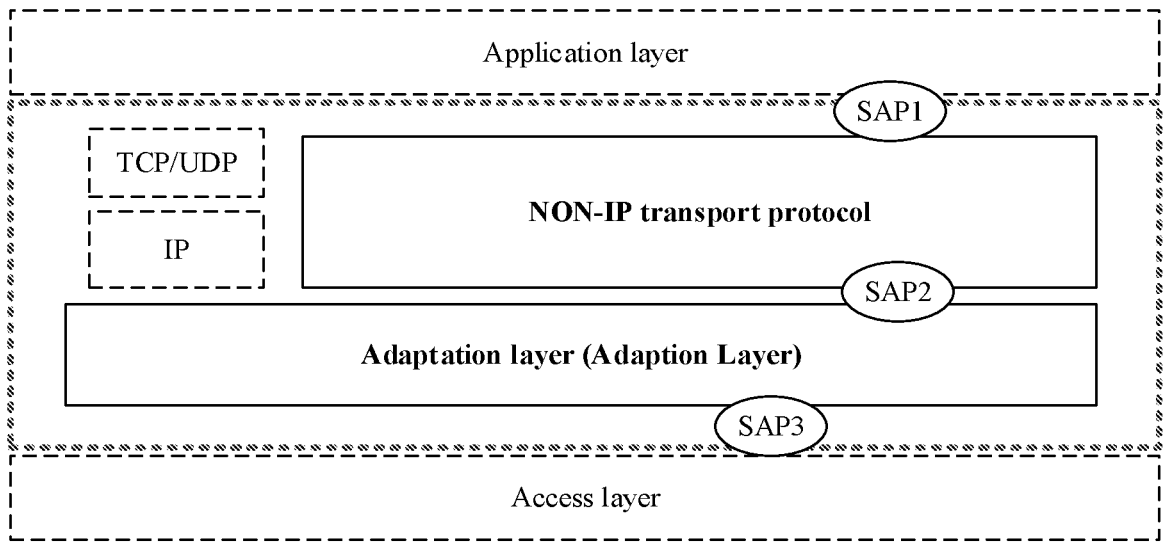
FIG. 4 is a schematic diagram of a possible specific protocol stack architecture of ITS system data transmission.

For example, FIG. 4 is a schematic diagram of a possible specific protocol stack architecture of ITS system data transmission. An adaptation layer is used as a sublayer of a "generalized network layer".

When an access layer technology is LTE-V2X, an access layer protocol stack includes, from top to bottom, a Packet Data Convergence Protocol (PDCP) layer, a radio link control (RLC) layer, a MAC layer, and a physical layer (PHY).

The PDCP layer may be configured to process data of an upper layer (above the PDCP layer). For example, in a user plane, after receiving the data from the upper layer, the PDCP layer may perform header compression and encryption on the data, and then submit the data to the RLC layer. In addition, the PDCP layer may further provide the upper layer with sequential submission and repeated packet detection functions. For example, in a control plane, the PDCP layer may provide the upper layer with an RRC signaling transmission service, and implement encryption and consistency protection of RRC signaling. The MAC layer provides a data transmission service on logical channels. The logical channels usually may be divided into two categories control channel and service channel. The control channel is configured to transmit control plane information, and the service channel is configured to transmit user plane information. In addition, the MAC layer may be further responsible for mapping the logical channel to a transport channel. The PHY layer is under the MAC layer. The PHY layer is mainly responsible for mapping the transport channel to a physical channel.

For example, the network layer may include a network protocol and/or a transport protocol of an Open Systems Interconnection (OSI) model, and is responsible for exchanging data with different applications and providing a connection-oriented service and/or data forwarding.

For example, the network layer may include a Dedicated Short Message Protocol (DSMP), a Geographic Location-based Network Protocol (GeoNetworking), a Wireless Access Short Message Protocol (e.g., Wireless Access in Vehicular Environments (WAVE) Short Message Protocol (WSMP)) in an internet-of-vehicles environment, at least one of non-Internet Protocol (IP) network protocols such as a Fast Network and Transport Layer Protocol (FNTP), and/or an IP network protocol. In addition, the network layer may further include a transport protocol such as a User Datagram Protocol (UDP)/Transmission Control Protocol (TCP). The network layer transmits a data packet that the application layer is interested in to the application layer, and receives a data packet from the application layer.

In a possible implementation form, the network layer may include only one of the non-IP protocols, for example, a DSMP.

The network layer may distinguish between different application layer services by using AID/PSID.

Information may be transferred between layers through an interface (or a service access point (SAP)). Further, information may be transferred between the application layer and the network layer in a form of a service primitive (SP) (or a primitive) through an interface SAP1, information may be transferred between the network layer and the adaptation layer in a form of a primitive through an interface SAP2, and information may be transferred between the adaptation layer and the access layer in a form of a primitive through an interface SAPS.

Usually, there are four types of primitives a request, an indication, a response, and a confirmation. The request is sent from an upper layer to a lower layer, to request the lower layer to provide a specified service, such as data transmission. The indication is sent from the lower layer to the upper layer, to notify the upper layer that something has happened, for example, the lower layer receives data sent by a remote peer entity. The response is sent from the upper layer to the lower layer, and is a response to the indication sent by the lower layer to the upper layer. The confirmation is sent from the lower layer to the upper layer, to indicate that the service requested by the upper layer request has been completed and is confirmed.

Using the protocol stack architecture shown in FIG. 4 as an example, for example, the upper layer requests a bottom layer to send data. In this case, the primitive (or a service primitive) transferred between the network layer and the adaptation layer through the SAP2 may include:

```
ADAPTATION-LAYER.request(
ApplicationIdentifier     //an AID or a PSID
ProtocolType              //network and/or transport protocol type information
Data                      //data (data submitted by the network layer to the adaptation
                          layer)
Peer address              //destination address information
Source address            //transmit address information
)
```

For example, the upper layer requests the bottom layer to send data. In this case, the primitive transmitted between the adaptation layer and the access layer through the SAP3 may include:

```
ACCESS-LAYER.request(
Source_address            //source address information of the access layer
Destination_address       //destination address information of the access
                          layer
Data                      //data (data submitted by the adaptation layer to the access
                          layer)
PDCP SDU type,            //data type information of the access layer)
```

Usually, a primitive includes one or more primitive parameters. For example, ApplicationIdentifier, NetworkProtocolType, Data, and the like included in the foregoing primitives are all primitive parameters.

It should be noted that, there is a particular correspondence between data and other primitive parameter information. For example, the destination address information indicates a destination address to which the data is sent. The network and/or transport protocol type information indicates a network and/or a transport protocol corresponding to the data, such as an IP, or a non-IP. Optionally, for Non-IP data, the destination address information may alternatively indicate a non-IP protocol corresponding to the data. For example, the WSMP, the DSMP, the FNTP, and the GeoNetworking protocol are all typical non-IP protocols. The network and/or transport protocol type information may indicate a DSMP corresponding to the data.

It should be noted that such a correspondence may be implicit or may be explicit.

Figure 5:
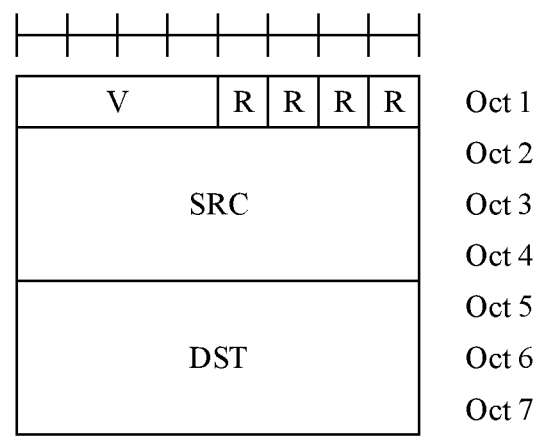
FIG. 5 is a schematic structural diagram of a packet header of a media access control (MAC) layer data packet of a sidelink.

The sidelink-based V2X communication supports only a broadcast communication mode, and does not support a unicast or multicast communication mode, for the following two main reasons:

(1) In a current LTE V2X protocol, a communication mode is indicated at the access layer by using version number information carried in a packet header of a MAC layer data packet. For example, FIG. 5 is a schematic structural diagram of a packet header of a MAC layer data packet of a sidelink, and V in a field (Oct) 1 indicates a version number. However, in the current LTE V2X protocol, only "0011" is defined to be used to represent a broadcast transmission mode, and no representation manner is defined for a unicast transmission mode or a multicast transmission mode.

(2) Still referring to FIG. 5, in the current LTE V2X protocol, the packet header of the MAC layer data packet includes a source address (SRC) and a destination address (DST) of 24 bits. The address is referred to as an access layer address, and is also referred to as a layer-2 address or a MAC address. The DST is generated based on an AID or a PSID transferred by an upper layer (that is, the layer above the access layer), and therefore, can be used only to indicate a service type corresponding to data, and cannot identify a destination device (the destination device may also be referred to as a peer device herein) corresponding to the data. Therefore, the DST cannot support unicast or multicast communication.

It can be learned that, the sidelink-based V2X communication in the other approaches has a technical problem in which unicast or multicast communication cannot be supported.

To resolve the foregoing problem in the other approaches, an embodiment of this application provides a data sending method. An adaptation layer obtains data and attribute information corresponding to the data from a network layer. The attribute information includes destination address information. The adaptation layer then generates a first access layer address based on the destination address information. The adaptation layer then transfers the data and the first access layer address to an access layer, so that the access layer sends the data through a sidelink based on the first access layer address. Because the first access layer address is generated by the adaptation layer based on the destination address information obtained from the network layer, the first access layer address may indicate a destination device corresponding to the data, and then can effectively support sidelink-based V2X communication to implement unicast or multicast communication.

Application scenarios of the embodiments of this application are first described before the technical solutions provided in the embodiments of this application are described.

Figure 6A:
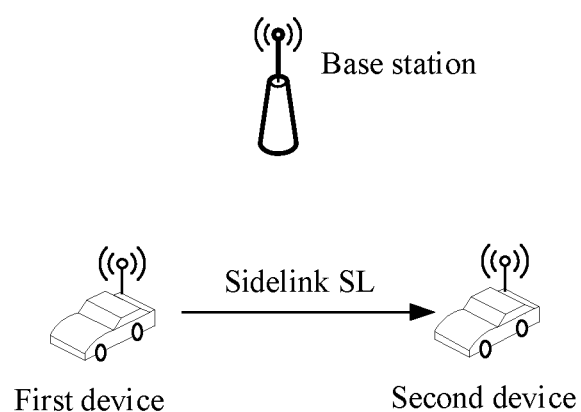
FIG. 6A and FIG. 6B are schematic diagrams of two application scenarios according to an embodiment of this application.

FIG. 6A may be an application scenario according to an embodiment of this application. FIG. 6A includes a first device, a second device, and a base station. The first device and the second device are based on a sidelink. For example, the first device sends data to the second device through the sidelink.

Figure 6B:
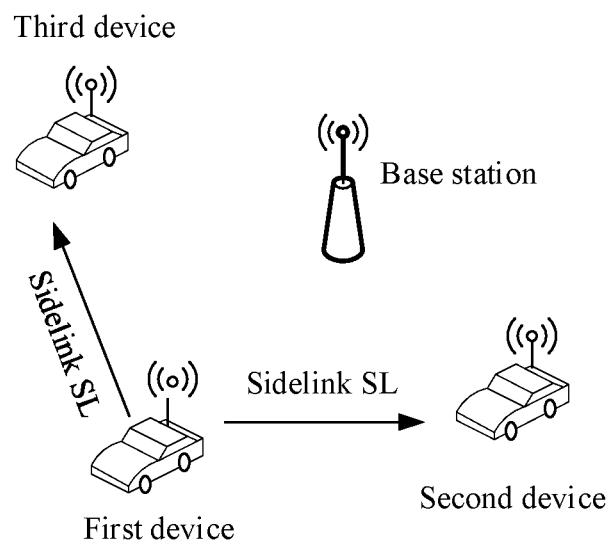

During specific implementation, in addition to the second device, destination devices corresponding to the first device may further include another device. This is not limited in this embodiment of this application. For example, FIG. 6B may be another application scenario according to an embodiment of this application. The first device may communicate with a plurality of devices (for example, a second device and a third device) based on the sidelink at the same time. Certainly, the second device and the third device in FIG. 6B are merely an example. During specific implementation, more devices may further communicate with the first device based on the sidelink. A quantity of devices is not limited in this embodiment of this application.

In both FIG. 6A and FIG. 6B, that a terminal is a vehicle is used as an example.

The following describes, with reference to the accompanying drawings, the technical solutions provided in the embodiments of this application.

Figure 7:
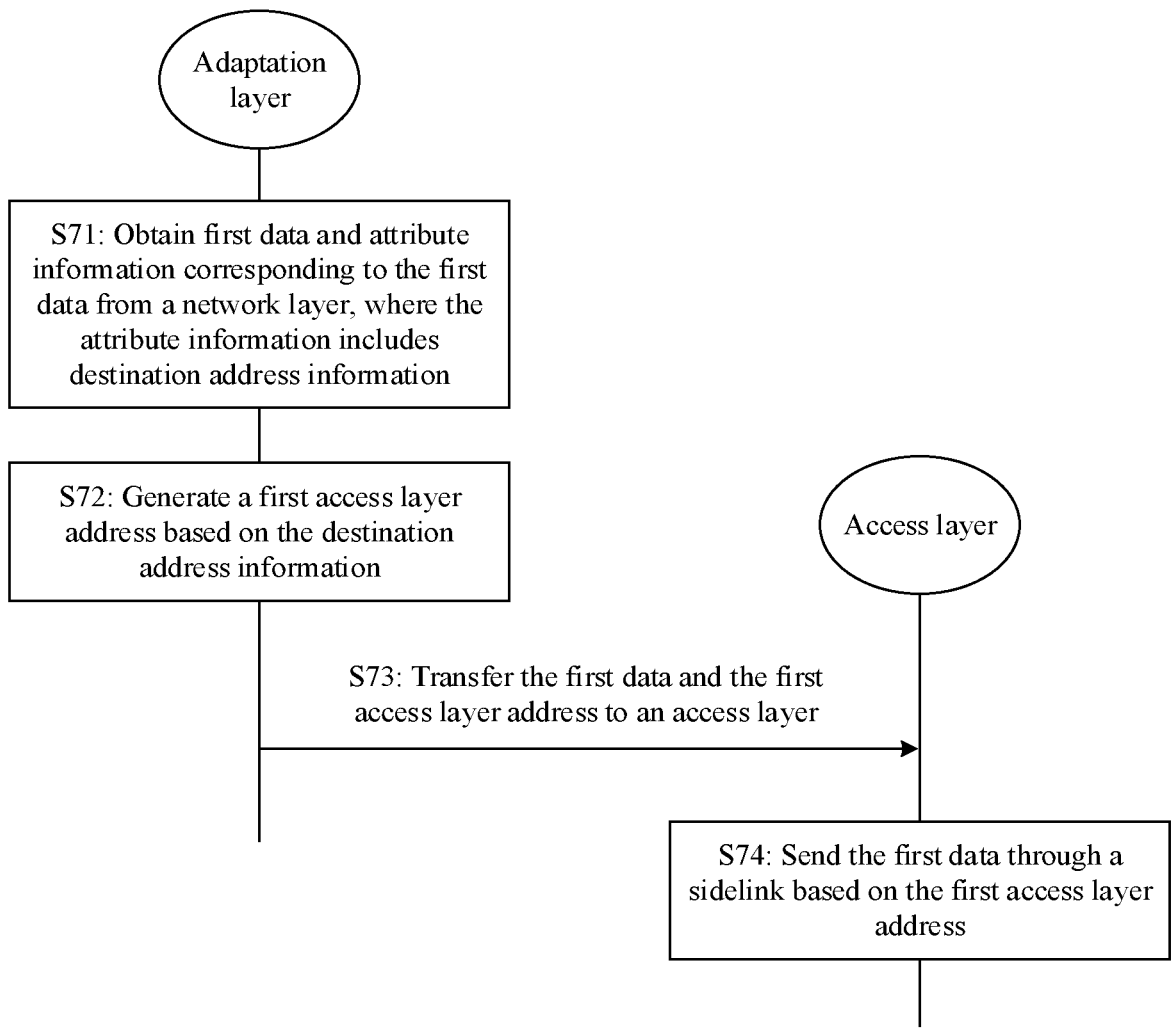
FIG. 7 is a schematic flowchart of a service data transmission method according to an embodiment of this application.

An embodiment of this application provides a service data transmission method. The method may be performed by the first device in FIG. 6A and FIG. 6B. FIG. 7 is a flowchart of the method.

S71: An adaptation layer of the first device obtains first data and attribute information corresponding to the first data from a network layer of the first device.

Further, the adaptation layer may obtain the first data and the attribute information corresponding to the first data from the network layer by using a primitive of an interface SAP2 between the adaptation layer and the network layer.

The attribute information includes at least destination address information. The destination address information may indicate one destination device, or may indicate a plurality of destination devices. This is not limited in this embodiment of this application. For example, in the application scenario shown in FIG. 6A, the destination address information may be one unicast address, for example, an address of the second device. In this case, the destination device corresponding to the first device may be the second device only. For another example, in the application scenario shown in FIG. 6B, the destination address information may be one multicast address. In this case, the destination address information may correspond to a plurality of destination devices, for example, the second device and the third device.

During specific implementation, in addition to including the destination address information, the attribute information may further include other information, such as source address information corresponding to the first data, network and/or transport protocol type information (used to indicate a network and/or a transport protocol, such as an IP, a WSMP, an FNTP, or a DSMP), an AID, and a PSID. This is not limited in this embodiment of this application. A correspondence between the first data and the attribute information may be implicit, or may be explicit. This is not limited in this embodiment of this application.

During specific implementation, the destination address information and the source address information may be indicated by using two different primitives respectively, or may be indicated by using one primitive. This is not limited in this embodiment of this application. When the destination address information and the source address information are indicated by using one primitive, the primitive needs to be parsed to obtain the destination address information. For example, the destination address information and the source address information are spliced to form one primitive. The adaptation layer parses a low-order field of the primitive to obtain the destination address information. A specific method and rule for parsing out the destination address information by the adaptation layer is not limited in this embodiment of this application.

S72: The adaptation layer generates a first access layer address based on the destination address information.

In a possible design, the adaptation layer may obtain the first access layer address by intercepting a preset field in the destination address. The preset field may be a field at any location in the destination address information. This is not limited in this embodiment of this application.

For example, the adaptation layer may use a field on most significant 24 bits or a field on least significant 24 bits in the destination address information as the first access layer address.

For another example, the adaptation layer may splice a first preset field and a second preset field in the destination address information as the first access layer address. A specific splicing manner is not limited in this embodiment of this application.

In a possible design, the adaptation layer may alternatively generate a first access layer address based on the destination address information when determining that an addressing type corresponding to the first data is address-based addressing.

In this embodiment of this application, specific solutions in which the adaptation layer determines that the addressing type corresponding to the first data is address-based addressing include but are not limited to the following four solutions:

Solution 1: The adaptation layer determines, based on the destination address information, that the addressing type is address-based addressing.

Further, specific implementations in which the adaptation layer determines, based on the destination address information, that the addressing type is address-based addressing may further include the following three implementations:

First implementation: The destination address information may have a plurality of bits, and the adaptation layer determines, based on a value of the destination address information, that the addressing type is address-based addressing.

Further, the adaptation layer may determine, when determining that the value of the destination address information falls within a predetermined value range, that the addressing type is address-based addressing.

For example, when the value of the destination address information is greater than or equal to a first threshold, the adaptation layer determines that the addressing type is address-based addressing. Alternatively, when the value of the destination address information is less than or equal to a second threshold, the adaptation layer determines that the addressing type is address-based addressing. Alternatively, when the value of the destination address information is greater than or equal to a third threshold and is less than or equal to a fourth threshold, the adaptation layer determines that the addressing type is address-based addressing. Certainly, the foregoing are merely examples of some possible forms of the value range. In a specific embodiment, the value range may alternatively have another representation form. This is not limited in this embodiment of this application.

A specific example is used for description. Assuming that the first threshold is $2^{10}$, when the destination address information is greater than or equal to $2^{10}$, the adaptation layer determines that the addressing type corresponding to the first data is address-based addressing.

During specific implementation, the foregoing thresholds may be preconfigured on the first device (for example, preconfigured on a subscriber identity module (SIM) card of the first device), or may be transmitted by the base station to the first device by using RRC signaling. This is not limited in this embodiment of this application. Both dedicated RRC signaling and a SIB message are referred to as RRC signaling.

Second implementation: The destination address information may have a plurality of bits, and the adaptation layer may determine, based on a bit quantity of the destination address information, that the addressing type is address-based addressing.

Further, the adaptation layer may determine, when determining that the bit quantity of the destination address information falls within a predetermined bit quantity range, that the addressing type is address-based addressing.

For example, when the bit quantity of the destination address information is greater than or equal to a first bit quantity, the adaptation layer determines that the addressing type is address-based addressing. Alternatively, when the bit quantity of the destination address information is less than or equal to a second bit quantity, the adaptation layer determines that the addressing type is address-based addressing. Alternatively, when the bit quantity of the destination address information is greater than or equal to a third bit quantity and is less than or equal to a fourth bit quantity, the adaptation layer determines that the addressing type is address-based addressing. Certainly, the foregoing are merely examples of some possible forms of the bit quantity range. In a specific embodiment, the bit quantity range may alternatively have another representation form. This is not limited in this embodiment of this application.

A specific example is used for description. Assuming that the second bit quantity is 48 bits, when the bit quantity of the destination address information is less than or equal to 48 bits, the adaptation layer determines that the addressing type is address-based addressing.

During specific implementation, the foregoing preset bit quantities may be preconfigured on the first device (for example, preconfigured on, but not limited to, a SIM card of the first device), or may be transmitted by the base station to the first device by using RRC signaling. This is not limited in this embodiment of this application. Both dedicated RRC signaling and a SIB message are referred to as RRC signaling.

Third implementation: The destination address information may have a plurality of bits, different bits in the destination address information may have different meanings, and the adaptation layer may determine, based on a preset field in the destination address information, that the addressing type is address-based addressing.

Figure 8:
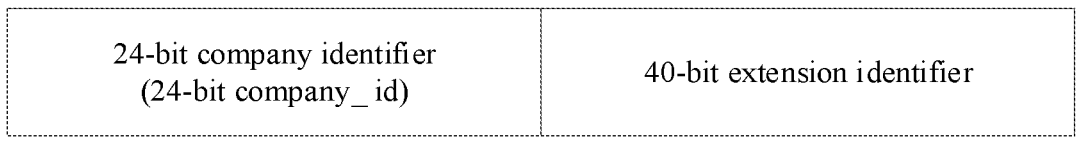
FIG. 8 is a possible schematic diagram of destination address information.

For example, FIG. 8 is a possible schematic diagram of destination address information. As shown in FIG. 8, the destination address information has a total of 64 bits. First 24 bits may be used to identify a company ID (company_id) corresponding to a destination device. Last 40 bits are an extension identifier. The first 24 bits and the last 40 bits jointly determine an address of the destination device.

Specific implementations in which the adaptation layer determines, based on the preset field in the destination address information, that the addressing type is address-based addressing may further include the following three implementations:

(1) The preset field in the destination address information indicates that a transmission mode corresponding to the first data is unicast or multicast. Correspondingly, when the adaptation layer determines that the preset field in the destination address information indicates that the transmission mode corresponding to the first data is unicast or multicast, the adaptation layer determines that the addressing type is address-based addressing.

For example, the first preset field in the destination address information includes 2 bits, where 00 represents unicast, 01 represents multicast, and 10 represents broadcast. In this case, when the adaptation layer parses the first preset field to obtain 00, the adaptation layer determines that the addressing type corresponding to the first data is address-based addressing. A specific location of the first preset field and meanings represented by different values may be specified by using a protocol.

(2) The preset field indicates that the addressing type of the first data is address-based addressing.

For example, the second preset field in the destination address information includes 1 bit, where 0 represents address-based addressing, and 1 represents service type-based addressing. In this case, when the adaptation layer parses the second preset field to obtain 0, the adaptation layer determines that the addressing type corresponding to the first data is address-based addressing. A specific location of the second preset field and meanings represented by different values may be specified by using a protocol.

(3) The preset field in the destination address information indicates that a transmission mode corresponding to the first data is non-broadcast.

Correspondingly, when the adaptation layer determines that the preset field in the destination address information indicates that the transmission mode corresponding to the first data is non-broadcast, the adaptation layer determines that the addressing type is address-based addressing.

For example, a third preset field in the destination address information includes 1 bit, where 0 represents broadcast, and 1 represents non-broadcast. In this case, when the adaptation layer parses the third preset field to obtain 1, the adaptation layer determines that the addressing type corresponding to the first data is address-based addressing. A specific location of the third preset field and meanings represented by different values may be specified by using a protocol.

Solution 2: The adaptation layer determines, based on service type information, that the addressing type is address-based addressing.

In this implementation, in addition to including the destination address information, the attribute information obtained by the adaptation layer from the network layer in step S71 may further include service type information. The service type information is used to indicate a service type corresponding to the first data, for example, a collision warning service or a vehicle platooning service. For example, in this embodiment of this application, the service type information may be the AID or the PSID described above.

Similar to the solution 1, the service type information may also have a plurality of bits. Specific implementations in which the adaptation layer determines, based on the service type information, that the addressing type is address-based addressing may further include the following three implementations:

First implementation: The adaptation layer determines, based on a value of the service type information, that the addressing type is address-based addressing.

Further, the adaptation layer may determine, when determining that the value of the service type information falls within a predetermined value range, that the addressing type is address-based addressing.

For example, when the value of the service type information is greater than or equal to a fifth threshold, the adaptation layer determines that the addressing type is address-based addressing. Alternatively, when the value of the service type information is less than or equal to a sixth threshold, the adaptation layer determines that the addressing type is address-based addressing. Alternatively, when the value of the service type information is greater than or equal to a seventh threshold and is less than or equal to an eighth threshold, the adaptation layer determines that the addressing type is address-based addressing. Certainly, the foregoing are merely examples of some possible forms of the value range. In a specific embodiment, the value range may alternatively have another representation form. This is not limited in this embodiment of this application.

A specific example is used for description. Assuming that the seventh threshold is $2^{10}$, and the eighth threshold is $2^{12}$, when the service type information is greater than $2^{10}$ and less than $2^{12}$, the adaptation layer determines that the addressing type corresponding to the first data is address-based addressing.

Similarly, during specific implementation, the foregoing thresholds may be preconfigured on a fifth device (for example, preconfigured on, but not limited to, a SIM card of the fifth device), or may be transmitted by the base station to the fifth device by using RRC signaling. This is not limited in this embodiment of this application.

Second implementation: The adaptation layer may determine, based on a bit quantity of the service type information, that the addressing type is address-based addressing.

Further, the adaptation layer may determine, when determining that the bit quantity of the service type information falls within a predetermined bit quantity range, that the addressing type is address-based addressing.

For example, when the bit quantity of the service type information is greater than or equal to a fifth bit quantity, the adaptation layer determines that the addressing type is address-based addressing. Alternatively, when the bit quantity of the service type information is less than or equal to a sixth bit quantity, the adaptation layer determines that the addressing type is address-based addressing. Alternatively, when the bit quantity of the service type information is greater than or equal to a seventh bit quantity and is less than or equal to an eighth bit quantity, the adaptation layer determines that the addressing type is address-based addressing. Certainly, the foregoing are merely examples of some possible forms of the bit quantity range. In a specific embodiment, the bit quantity range may alternatively have another representation form. This is not limited in this embodiment of this application.

A specific example is used for description. Assuming that the fifth bit quantity is 48 bits, when the bit quantity of the service type information is greater than 48 bits, the adaptation layer determines that the addressing type is address-based addressing.

Similarly, during specific implementation, the foregoing preset bit quantities may be preconfigured on the first device (for example, preconfigured on, but not limited to, a SIM card of the first device), or may be transmitted by the base station to the first device by using RRC signaling. This is not limited in this embodiment of this application.

Third implementation: Different bits in the service type information may have different meanings, and the adaptation layer may determine, based on a preset field in the service type information, that the addressing type is address-based addressing.

Similarly, specific implementations in which the adaptation layer determines, based on the preset field in the service type information, that the addressing type is address-based addressing may further include the following three implementations:

(1) The preset field in the service type information indicates that a transmission mode corresponding to the first data is unicast or multicast. Correspondingly, when the adaptation layer determines that the preset field in the service type information indicates that the transmission mode corresponding to the first data is unicast or multicast, the adaptation layer determines that the addressing type is address-based addressing.

For example, a fourth preset field in the service type information includes 2 bits, where 00 represents unicast, 01 represents multicast, and 10 represents broadcast. In this case, when the adaptation layer parses the fourth preset field to obtain 00, the adaptation layer determines that the addressing type corresponding to the first data is address-based addressing. A specific location of the fourth preset field and meanings represented by different values may be specified by using a protocol.

(2) The preset field in the service type information indicates that the addressing type of the first data is address-based addressing.

For example, a fifth preset field in the service type information includes 1 bit, where 1 represents address-based addressing, and 0 represents service type-based addressing. In this case, when the adaptation layer parses the fifth preset field to obtain 1, the adaptation layer determines that the addressing type corresponding to the first data is address-based addressing. A specific location of the fifth preset field and meanings represented by different values may be specified by using a protocol.

(3) The preset field in the service type information indicates that a transmission mode corresponding to the first data is non-broadcast.

Correspondingly, when the adaptation layer determines that the preset field in the service type information indicates that the transmission mode corresponding to the first data is non-broadcast, the adaptation layer determines that the addressing type is address-based addressing.

For example, a sixth preset field in the service type information includes 1 bit, where 0 represents broadcast, and 1 represents non-broadcast. In this case, when the adaptation layer parses the sixth preset field to obtain 1, the adaptation layer determines that the addressing type corresponding to the first data is address-based addressing. A specific location of the sixth preset field and meanings represented by different values may be specified by using a protocol.

Solution 3: The adaptation layer determines, based on the service type information and the destination address information, that the addressing type corresponding to the first data is address-based addressing.

In this implementation, in addition to including the destination address information, the attribute information obtained by the adaptation layer from the network layer in step S71 may further include the service type information. For a specific implementation of the service type information in this implementation, refer to the specific implementation of the service type information in the solution 2. Details are not described herein again.

A specific implementation in which the adaptation layer determines, based on the service type information and the destination address information, that the addressing type corresponding to the first data is address-based addressing may be a combination of any implementation in the solution 1 and/or the solution 2.

For example, the destination address information includes a seventh preset field, and the seventh preset field includes two bits, where 01 represents unicast, 00 represents multicast, and 11 represents broadcast. A threshold being $2^{24}$ is further configured on the first device. When the adaptation layer parses the seventh preset field to obtain 00, and the value of the destination address information is greater than or equal to $2^{24}$, the adaptation layer determines that the addressing type corresponding to the first data is address-based addressing.

For example, the service type information includes an eighth preset field, and the eighth preset field includes 1 bit, where 0 represents address-based addressing, and 1 represents service type-based addressing. A threshold being $2^{64}$ is further configured on the first device. When the adaptation layer parses the eighth preset field to obtain 0, and the value of the service type information is less than or equal to the threshold $2^{64}$, the adaptation layer determines that the addressing type corresponding to the first data is address-based addressing.

For example, the service type information includes a ninth preset field, and the ninth preset field includes two bits, where 01 represents unicast, 00 represents multicast, and 11 represents broadcast. Thresholds being $2^{24}$ and $2^{64}$ are further configured on the first device. When the adaptation layer parses the ninth preset field to obtain 00, and the value of the destination address information is greater than $2^{24}$ and is less than $2^{64}$, the adaptation layer determines that the addressing type corresponding to the first data is address-based addressing.

Certainly, the foregoing three combination manners are merely examples. During specific implementation, specific combination manners are not limited to the foregoing three combination manners. Details are not described in this embodiment of this application.

Solution 4: The adaptation layer determines, based on transmission mode indication information, that the addressing type corresponding to the first data is address-based addressing.

In this implementation, in addition to including the destination address information, the attribute information obtained by the adaptation layer from the network layer in step S71 may further include the transmission mode indication information.

Further, when the transmission mode indication information indicates address-based addressing, the adaptation layer determines that the addressing type corresponding to the first data is address-based addressing. Alternatively, when the transmission mode indication information indicates that the transmission mode corresponding to the first data is unicast or multicast, the adaptation layer determines that the addressing type corresponding to the first data is address-based addressing. Alternatively, when the transmission mode indication information indicates that the transmission mode corresponding to the first data is non-broadcast, the adaptation layer determines that the addressing type corresponding to the first data is address-based addressing.

The transmission mode indication information may be a primitive parameter newly added to SAP2, and is specially used to indicate the addressing type or the transmission mode corresponding to the first data.

S73: The adaptation layer transfers the first data and the first access layer address to an access layer of the first device.

Further, the adaptation layer may transfer the first data and the first access layer address to the access layer of the first device by using a primitive of an interface SAP3 between the adaptation layer and the access layer.

It should be noted that, the adaptation layer may transfer the first data to the access layer in a form of a data packet. The data packet includes the first data. Usually, when the first data passes through different protocol layers, each protocol layer adds packet header information of the protocol layer.

S74: The access layer sends the first data through a sidelink based on the first access layer address.

Further, the access layer adds the first access layer address to a packet header of a MAC layer data packet carrying the first data. In this way, after the first device sends out the data packet whose packet header information includes the first access layer address, the destination device may determine, based on the packet header information in the data packet, whether the first data in the data packet is data sent to the destination device, and receive the first data in the data packet when determining that the address of the destination device matches the first access layer address in the data packet. Further, unicast communication is implemented when the destination address information indicates an address of a single destination device, and multicast communication is implemented when the destination address information indicates addresses of a plurality of destination devices.

It can be learned from the foregoing description that, in this embodiment of this application, the adaptation layer of the first device obtains the first data and the attribute information corresponding to the first data from the network layer. The attribute information includes the destination address information. The adaptation layer then generates the first access layer address based on the destination address information. Subsequently, the adaptation layer transfers the first data and the first access layer address to the access layer, so that the access layer sends the first data through the sidelink based on the first access layer address. Because the first access layer address is generated by the adaptation layer based on the destination address information, the first access layer address may indicate the destination device corresponding to the first data. In this case, when receiving data, the destination device may determine, based on the first access layer address, whether the first data is data sent to the destination device, and receive the first data when determining that the address of the destination device matches the first access layer address. Further, unicast communication is implemented when the destination address information indicates an address of a single destination device, and multicast communication is implemented when the destination address information indicates addresses of a plurality of destination devices. This effectively resolves the technical problem in which sidelink-based V2X communication cannot support unicast or multicast communication.

For solution integrity, in a possible design, in this embodiment of this application, after step S71 is performed, alternatively, it may be determined that the addressing type is not address-based addressing, but, for example, service type-based addressing.

Further, when the addressing type corresponding to the first data is service type-based addressing, the adaptation layer may generate a second access layer address based on the service type information, and then the adaptation layer transfers the first data and the second access layer address to the access layer of the first device, so that the access layer sends the first data through the sidelink based on the second access layer address.

In this implementation, based on a correspondence between a service type and the second access layer address, a receive end device can identify, based on the second access layer address, only a service type corresponding to the first data, and cannot identify the destination device corresponding to the first data. Therefore, only broadcast communication can be implemented in such a manner.

Figure 9:
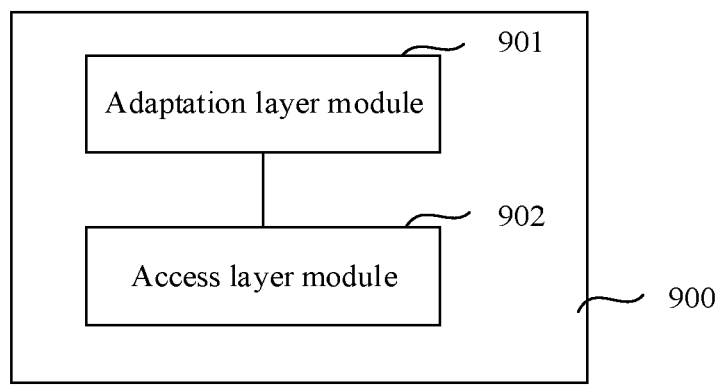
FIG. 9 is a schematic structural diagram of a possible data sending apparatus according to an embodiment of this application.

Based on a same technical concept, an embodiment of this application further provides a data sending apparatus. FIG. 9 is a possible schematic structural diagram of the data sending apparatus. The data sending apparatus 900 includes an adaptation layer module 901 configured to obtain first data and attribute information corresponding to the first data from a network layer, where the attribute information includes destination address information, generate a first access layer address based on the destination address information, and transfer the first data and the first access layer address to an access layer module 902, and the access layer module 902 configured to send the first data through a sidelink based on the first access layer address.

In a possible design, the adaptation layer module 901 is further configured to before generating the first access layer address based on the destination address information, determine that an addressing type corresponding to the first data is address-based addressing.

When the adaptation layer module 901 determines that the addressing type corresponding to the first data is address-based addressing, further, the adaptation layer module 901 may determine, based on a value of the destination address information, that the addressing type is address-based addressing, or the adaptation layer module 901 may determine, based on a bit quantity of the destination address information, that the addressing type is address-based addressing, or the adaptation layer module 901 may determine, based on a preset field in the destination address information, that the addressing type is address-based addressing.

For example, in this embodiment of this application, when determining, based on the value of the destination address information, that the addressing type is address-based addressing, the adaptation layer module 901 is further configured to, when the value of the destination address information is greater than or equal to a first threshold, determine that the addressing type is address-based addressing, or when the value of the destination address information is less than or equal to a second threshold, determine that the addressing type is address-based addressing, or when the value of the destination address information is greater than or equal to a third threshold and is less than or equal to a fourth threshold, determine that the addressing type is address-based addressing.

For example, in this embodiment of this application, the preset field may indicate that the addressing type of the first data is address-based addressing. To be specific, when the preset field indicates that the addressing type of the first data is address-based addressing, the adaptation layer module 901 determines that the addressing type is address-based addressing. Alternatively, the preset field may indicate that a transmission mode corresponding to the first data is non-broadcast. Correspondingly, when the preset field in the destination address information indicates that the transmission mode corresponding to the first data is non-broadcast, the adaptation layer module 901 determines that the addressing type is address-based addressing. Alternatively, the preset field indicates that a transmission mode corresponding to the first data is unicast or multicast. Correspondingly, when the preset field in the destination address information indicates that the transmission mode corresponding to the first data is unicast or multicast, the adaptation layer module 901 determines that the addressing type is address-based addressing.

In an alternative design, the adaptation layer module 901 may determine, based on the service type information, that the addressing type corresponding to the first data is address-based addressing. Correspondingly, the attribute information may further include the service type information corresponding to the first data. The service type information indicates a service type corresponding to the first data.

When the adaptation layer module 901 determines, based on the service type information, that the addressing type corresponding to the first data is address-based addressing, further, the adaptation layer module 901 may determine, based on a value of the service type information, that the addressing type is address-based addressing, or the adaptation layer module 901 may determine, based on a bit quantity of the service type information, that the addressing type is address-based addressing, or the adaptation layer module 901 may determine, based on a preset field in the service type information, that the addressing type is address-based addressing.

For example, in this embodiment of this application, when determining, based on the value of the service type information, that the addressing type is address-based addressing, the adaptation layer module 901 is further configured to, when the value of the service type information is greater than or equal to a fifth threshold, determine that the addressing type is address-based addressing, or when the value of the service type information is less than or equal to a sixth threshold, determine that the addressing type is address-based addressing, or when the value of the service type information is greater than or equal to a seventh threshold and is less than or equal to an eighth threshold, determine that the addressing type is address-based addressing.

For example, in this embodiment of this application, the preset field may indicate that the addressing type of the first data is address-based addressing. To be specific, when the preset field indicates that the addressing type of the first data is address-based addressing, the adaptation layer module 901 determines that the addressing type is address-based addressing. Alternatively, the preset field indicates that a transmission mode corresponding to the first data is non-broadcast. Correspondingly, when the preset field in the service type information indicates that the transmission mode corresponding to the first data is non-broadcast, the adaptation layer module 901 determines that the addressing type is address-based addressing. Alternatively, the preset field indicates that a transmission mode corresponding to the first data is unicast or multicast.

Correspondingly, when the preset field in the service type information indicates that the transmission mode corresponding to the first data is unicast or multicast, the adaptation layer module 901 determines that the addressing type is address-based addressing.

In a possible design, the service type information may be an AID or a PSID.

In another alternative design, when determining that the addressing type corresponding to the first data is address-based addressing, the adaptation layer module 901 may determine, based on the transmission mode indication information, that the addressing type corresponding to the first data is address-based addressing. Correspondingly, the attribute information may further include the transmission mode indication information corresponding to the first data. The transmission mode indication information indicates a transmission mode corresponding to the first data.

For example, when the transmission mode indication information indicates that the transmission mode corresponding to the first data is unicast or multicast, the adaptation layer module 901 determines that the addressing type is address-based addressing.

For example, when the transmission mode indication information indicates that the transmission mode corresponding to the first data is non-broadcast, the adaptation layer module 901 determines that the addressing type is address-based addressing.

In a possible design, the adaptation layer module 901 is further configured to use a field on most significant 24 bits or a field on least significant 24 bits in the destination address information as the first access layer address.

The method and the apparatus in this application are based on a same technical concept, and problem resolving principles of the method and the apparatus are similar. Therefore, for specific implementations of the operations performed by the foregoing modules, refer to the corresponding steps in the data transmission method in the embodiments of this application. Therefore, implementations of the apparatus and the method may be cross-referenced. No repetition is made.

Figure 10:
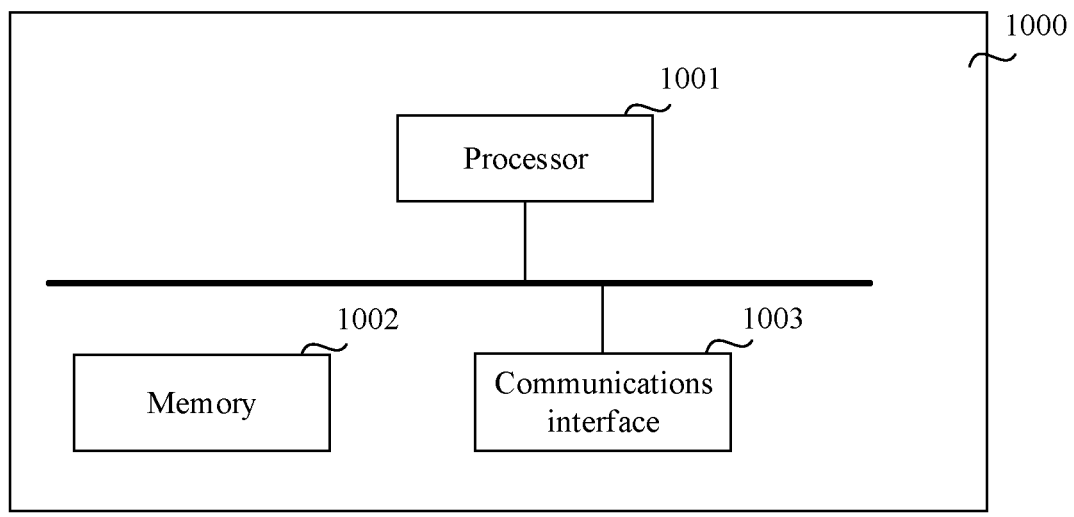
FIG. 10 is a schematic structural diagram of another possible data sending apparatus according to an embodiment of this application.

Based on a same technical concept, an embodiment of this application further provides a data sending apparatus 1000. Referring to FIG. 10, the apparatus 1000 includes at least one processor 1001, and a memory 1002 and a communications interface 1003 that are communicatively connected to the at least one processor 1001. The memory 1002 stores an instruction that can be executed by the at least one processor 1001. The at least one processor 1001 executes the instruction stored in the memory 1002, to perform, by using the communications interface 1003, the data transmission method in the embodiments of this application.

In an optional implementation, in this embodiment of this application, the processor 1001 may further include a central processing unit (CPU) and an application-specific integrated circuit (ASIC), and may be one or more integrated circuits configured to control program execution, or may be a hardware circuit that is developed by using a field-programmable gate array (FPGA), or may be a baseband processor.

In an optional implementation, in this embodiment of this application, the processor 1001 may include at least one processing core.

In an optional implementation, in this embodiment of this application, the memory 1002 may include a read-only memory (ROM), a random-access memory (RAM), and a magnetic disk memory. The memory 1002 is configured to store data used by the processor 1001 during operation.

The method and the apparatus in this application are based on a same technical concept, and problem resolving principles of the method and the apparatus are similar. Therefore, for specific implementations of the operations performed by the foregoing at least one processor 1001, refer to the corresponding steps in the data transmission method in the embodiments of this application. Therefore, implementations of the apparatus and the method may be cross-referenced. No repetition is made.

An embodiment of this application further provides a computer-readable storage medium. The computer-readable storage medium stores a computer program. The computer program includes a program instruction. When executed by a computer, the computer is enabled to perform the data transmission method in the embodiments of this application.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD), a semiconductor medium (for example, a solid-state drive (SSD)), or the like.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A data sending method, comprising:
obtaining, by an adaptation layer and from a network layer, first data and attribute information corresponding to the first data, wherein the attribute information comprises destination address information, and wherein an addressing type corresponding to the first data and that is obtained at the adaptation layer is an address-based addressing;
generating, by the adaptation layer, a first access layer address based on the destination address information;
transferring, by the adaptation layer and to an access layer, the first data and the first access layer address; and
sending, by the access layer, the first data through a sidelink based on the first access layer address.

2. The data sending method of claim 1, wherein the addressing type is the address-based addressing that is based on a first value of the destination address information or a first preset field in the destination address information.

3. The data sending method of claim 1, wherein the attribute information further comprises service type information corresponding to the first data, wherein the service type information indicates a service type corresponding to the first data, and wherein the addressing type corresponding to the first data is the address-based addressing that is based on the service type information.

4. The data sending method of claim 3, wherein the addressing type is the address-based addressing that is based on a second value of the service type information or a second preset field in the service type information.

5. The data sending method of claim 3, wherein the service type information is an application identifier (AID) or a provider service identifier (PSID).

6. The data sending method of claim 1, wherein the attribute information further comprises transmission mode indication information corresponding to the first data, wherein the transmission mode indication information indicates a transmission mode corresponding to the first data, and wherein the addressing type is the address-based addressing that is based on the transmission mode indication information.

7. The data sending method of claim 6, further comprising determining, based on the transmission mode indication information, that the addressing type corresponding to the first data is address-based addressing comprises:
identifying that the transmission mode indication information indicates that the transmission mode is unicast or multicast; and
further determining, in response to identifying that the transmission mode is unicast or multicast, that the addressing type is the address-based addressing.

8. The data sending method of claim 1, wherein generating the first access layer address based on the destination address information comprises setting a first field on most significant 24 bits or a second field on least significant 24 bits in the destination address information as the first access layer address.

9. A data sending apparatus comprising:
a memory configured to store program instructions; and
a processor coupled to the memory and configured to execute the program instructions that when executed by the processor causes the data sending apparatus to:
obtain, at an adaptation layer, first data and attribute information corresponding to the first data from a network layer, wherein the attribute information comprises destination address information, and wherein an addressing type corresponding to the first data and that is obtained at the adaptation layer is an address-based addressing;
generate, at the adaptation layer, a first access layer address based on the destination address information;
transfer, at the adaptation layer, the first data and the first access layer address to an access layer; and
send, at the access layer, the first data through a sidelink based on the first access layer address.

10. The data sending apparatus of claim 9, wherein the addressing type is the address-based addressing that is based on a first value of the destination address information or a first preset field in the destination address information.

11. The data sending apparatus of claim 9, wherein the attribute information further comprises service type information corresponding to the first data, wherein the service type information indicates a service type corresponding to the first data, and wherein the addressing type is the address-based addressing that is based on the service type information.

12. The data sending apparatus of claim 11, wherein the addressing type is the address-based addressing that is based on a second value of the service type information or a second preset field in the service type information.

13. The data sending apparatus of claim 11, wherein the service type information is an application identifier (AID) or a provider service identifier (PSID).

14. The data sending apparatus of claim 9, wherein the attribute information further comprises transmission mode indication information corresponding to the first data, wherein the transmission mode indication information indicates a transmission mode corresponding to the first data, and wherein the addressing type is the address-based addressing that is based on the transmission mode indication information.

15. The data sending apparatus of claim 14, wherein the program instructions that when executed by the processor further causes the data sending apparatus to:
identify that the transmission mode indication information indicates that the transmission mode is unicast or multicast; and
determine, at the adaptation layer and in response to identifying that the transmission mode is unicast or multicast, that the addressing type is the address-based addressing.

16. The data sending apparatus of claim 9, wherein the program instructions that when executed by the processor further causes the data sending apparatus to set, at the adaptation layer, a first field on most significant 24 bits in the destination address information or a second field on least significant 24 bits in the destination address information as the first access layer address.

17. A computer program product comprising computer-executable instructions that are stored on a non-transitory computer-readable storage medium and that, when executed by a processor, cause a data sending apparatus to:
obtain, by an adaptation layer, first data and attribute information corresponding to the first data from a network layer, wherein the attribute information comprises destination address information, wherein an addressing type corresponding to the first data and that is obtained at the adaptation layer is an address-based addressing, and wherein the data sending apparatus comprises the adaptation layer;
generate, by the adaptation layer, a first access layer address based on the destination address information;
transfer, by the adaptation layer, the first data and the first access layer address to an access layer, wherein the data sending apparatus comprises the access layer; and
send, by the access layer, the first data through a sidelink based on the first access layer address.

18. The computer program product of claim 17, wherein the computer-executable instructions further cause the data sending apparatus to set, by the adaptation layer, a first field on most significant 24 bits or a second field on least significant 24 bits in the destination address information as the first access layer address.

19. The computer program product of claim 17, wherein the attribute information further comprises service type information corresponding to the first data, wherein the service type information indicates a service type corresponding to the first data, and wherein the addressing type is the address-based addressing that is based on the service type information.

20. The computer program product of claim 17, wherein the attribute information further comprises transmission mode indication information corresponding to the first data, wherein the transmission mode indication information indicates a transmission mode corresponding to the first data, and wherein the addressing type is the address-based addressing that is based on the transmission mode indication information.

* * * * *